May 7, 1940.　　　T. R. WEBER　　　2,199,381
ELLIPTIC SPRING
Filed Feb. 16, 1939
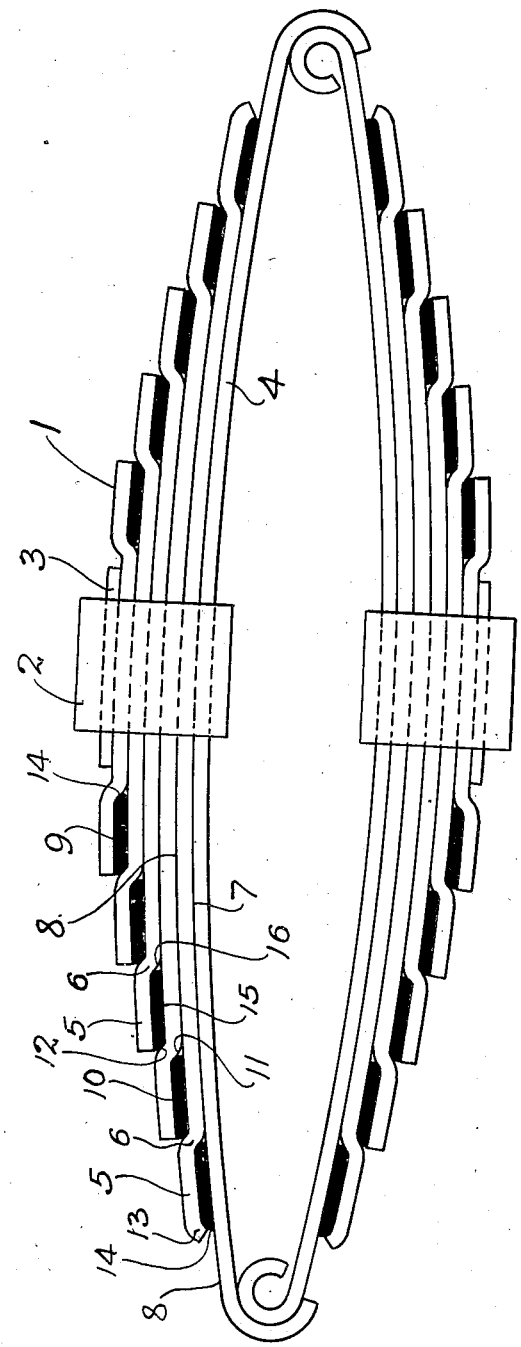
INVENTOR
Theodore R. Weber
BY S. C. Yeaton
ATTORNEY Patented May 7, 1940

2,199,381

UNITED STATES PATENT OFFICE 2,199,381

ELLIPTIC SPRING

Theodore R. Weber, Latrobe, Pa., assignor to American Locomotive Company, New York, N. Y., a corporation of New York Application February 16, 1939, Serial No. 256,650

5 Claims. (Cl. 267—47)

This invention relates to elliptic springs having anti-friction inserts between the leaves, and more particularly to such a spring in which the leaves have offset ends and inserts disposed in the offset portions for the purpose of controlling the friction caused by the pressure of one leaf upon the leaf adjacent to it.

It is customary to lubricate springs of the leaf or plate types in order that the friction present in such springs shall not become excessive due to corrosion and wearing of the surfaces of the leaves or plates. Lubrication is often unsatisfactory, however, for it results in an everchanging friction action depending upon the extent to which the spring is lubricated. That is to say, when a spring is freshly lubricated, there is little friction, and as the oil works out of the leaves, the friction steadily increases until it becomes excessive. There is no practical method of maintaining a constant amount of friction such as is desirable today in many instances where leaf springs are employed.

It is an object of the present invention to provide a leaf spring in which the amount of friction between the leaves can be controlled. This is important, for while in many cases it is only desirable to eliminate the excess friction between the leaves, in many other cases it is equally important to maintain a certain amount of friction which can be employed to snub the flexing action of the spring and act properly as a shock absorber.

The accompanying drawing forming a part of this application is a side elevation of a full elliptic spring embodying the present invention.

The elliptic spring 1 consists of two semi-elliptic springs which are substantially identical, and as each side of each semi-elliptic spring is identical on either side of the band 2 which holds the leaves of the spring together, a description of one side of one semi-elliptic spring is deemed sufficient to fully set forth the present invention.

The key 3 and the main leaf 4 are of ordinary design. Each of the other leaves terminates in an offset portion 5 connected to the main portion of the leaf by an outwardly extending portion 6. Each leaf successively outward from the main leaf is shorter in length as is customary with elliptic springs and has an inner face 7 in frictional engagement with the adjacent longer inner leaf. Each of the spring leaves, including the main leaf, has an outer face 8 in frictional engagement with the adjacent shorter outer leaf, the outer face of the shortest leaf engaging the adjacent face of the key 3.

Between the inner face 9 of each offset portion 5 and the face 8 opposite thereto is a recess or chamber 10 formed by the offsetting, in which is disposed a resilient insert later to be more fully described.

Each of the portions 6 has an inner face 11 and an outer face 12, each face 11 forming an inner end wall of a recess and each face 9 and the portion of the face 8 opposed thereto forming two opposed side walls of a recess. Each recess also has an outer end wall, as will presently appear, thus providing four walls which cooperate to maintain the respective inserts in place. The other two opposite sides of the recess are open. This permits the inserts to yield at these open ends if found necessary. The open ends also afford ready means for inspecting the inserts to examine their condition and to replace inserts when required without removing the plates.

The outer end wall of the recess formed by the offset in the leaf adjacent the main leaf 4 is formed by the portion 13 which is the extreme end of that leaf bent inward toward the main leaf. The outer end wall of each of the other recesses is formed by a face 12. There is a face 12 disposed adjacent the end of each successive leaf and it extends outward from the leaf of which it is a part almost to the offset portion of the leaf adjacent thereto.

In each of the recesses 10 is disposed a resilient insert 14, of rubber or other resilient material. These inserts are adapted to support some of the load carried by the respective leaves.

The dimensions of the inserts will be determined by the friction requirements which the spring designer must meet. In the drawing an insert is shown which has a thickness equal, when compressed by the normal load upon the spring, to the thickness of a spring leaf. The end of each leaf is also offset the thickness of a leaf. Therefore the inner face 15 of the insert acts as a continuation of the face of the leaf in the recess of which it is disposed. Nevertheless this insert eases up the pressure between the adjacent leaves. As there is no frictional sliding movement between the inserts and the adjacent leaves, some of the normal friction of the spring is eliminated.

When the spring flexes in use, there is a certain amount of longitudinal relative movement between the leaves. The inserts, being held firmly between the recess walls, and being resilient, yield internally during this leaf movement sufficiently so that this leaf movement is not interfered with. If additional friction must be eliminated, the inserts can be made thicker so that they relieve to the desired extent the pressure with which the leaves engage each other. By this method, the spring designer can control the amount of friction between adjacent spring leaves just inward of (back of) the inserts, and can thereby eliminate static friction without losing the desirable snubbing friction which is normal to leaf and plate springs.

It is well known that in leaf springs, the constant relative longitudinal movement of the leaves wears away the portions of the leaves adjacent each leaf end and leaves shoulders abutting each leaf end which act as an abutment and resist flexing of the spring, so that in an old spring a severe compression is necessary before each spring leaf end can surmount the shoulder worn in front of it. This trouble is present to some extent in practically all leaf springs. Where an ordinary insert is used, the shoulder is worn either by it or in it, as the case may be.

In the present invention, the insert being of resilient material, and each spring leaf end being offset as it is, there is no portion of the leaf which can wear a shoulder into the leaf adjacent it. The only "edge" of a leaf in contact with another, is the rounded portion of the offset, indicated by the numeral 16, and as this is held from severe friction, if not from all friction, by the insert, no shoulder can be worn at this point.

Inserts of various types between spring leaves to prevent friction have long been in use, but the present invention encompasses an insert and a leaf spring devised to retain the same which successfully overcomes obstacles long accepted as inherent to a leaf spring and results in a spring having many advantages over any known to the prior art.

The invention claimed and desired to be secured by Letters Patent is:

1. A multi-leaf spring comprising a leaf; another leaf disposed outwardly from said first mentioned leaf and in frictional engagement therewith, having a main portion, an offset portion and an outwardly extending portion connecting said main and offset portions, said offset portion being spaced from said first mentioned leaf and said first mentioned leaf having an outwardly extending portion directed toward the outer end of said offset portion providing a recess defined by said outwardly extending portions, said offset portion and the portion of said first mentioned leaf opposed to said offset portion; and a resilient insert disposed in said recess, said insert being held under compression between said leaves limiting the pressure with which said leaves engage each other and thereby controlling the friction of said leaves during flexing of said spring.

2. A multi-leaf spring comprising a main leaf; a plurality of successively shorter leaves successively stepped from said main leaf, adjacent leaves being in frictional engagement with each other, each of said successively shorter leaves having a main portion, an offset end portion and an outwardly extending portion connecting said main and offset portions, the leaf adjacent said main leaf having a portion at the end of its offset portion inwardly extending toward said main leaf, and the outwardly extending portions intermediate said main leaf and the shortest offset leaf of said spring being directed toward the outer end of the offset portion of the shorter leaf adjacent thereto, each offset portion being spaced from the adjacent longer leaf providing a recess, the recess adjacent said main leaf being defined by said offset portion of said leaf adjacent said main leaf, the opposed portion of said main leaf, the outwardly extending portion adjacent thereto and said inwardly extending portion, and the other recesses each being defined by the two adjacent outwardly extending portions, the intervening offset portion and the opposed portion of the longer leaf adjacent thereto, said intermediate outwardly extending portions each forming an inner end wall of one recess and an outer end wall of another recess; and resilient inserts disposed in said recesses, each said insert being held under compression between its adjacent leaves, limiting the pressure with which its said adjacent leaves engage each other, said inserts thereby controlling the friction of said leaves during flexing of said spring.

3. A multi-leaf spring comprising a main leaf; a plurality of successively shorter leaves successively stepped from said main leaf, each of said successively shorter leaves having a main portion, an offset end portion and an outwardly extending portion connecting said main and offset portions, each offset portion being spaced from the adjacent longer leaf providing a recess; and inserts disposed in said recesses limiting the pressure with which said leaves engage each other, each insert disposed between offset leaves being engaged by two outwardly extending portions, each outwardly extending portion between two inserts acting as an inner end wall of one recess and as an outer end wall of another recess preventing displacement theretoward of the inserts disposed in said recesses respectively.

4. A multi-leaf spring comprising a leaf; another leaf disposed outwardly from said first mentioned leaf and in frictional engagement therewith, having a main portion, an offset portion and an outwardly extending portion connecting said main and offset portions, said offset portion being spaced from said first mentioned leaf and said first mentioned leaf having an outwardly extending portion directed toward the outer end of said offset portion providing a recess having insert-retaining walls, defined by said outwardly extending portions, said offset portion and the portion of said first mentioned leaf opposed to said offset portion; and an insert disposed in said recess in engagement with said retaining walls adapted to decrease the pressure with which said leaves engage each other, thereby controlling the friction of said leaves during flexing of said spring.

5. A multi-leaf spring comprising a leaf; another leaf disposed outwardly from said first mentioned leaf and in frictional engagement therewith, having a main portion, an offset portion and an outwardly extending portion connecting said main and offset portions, said offset portion being spaced from said first mentioned leaf and said first mentioned leaf having an outwardly extending portion directed toward the outward end of said offset portion providing a recess, having insert-retaining walls and being open at its lateral sides, defined by said outwardly extending portions, said offset portion and the portion of said first mentioned leaf opposed to said offset portion; and an insert disposed in said recess in engagement with said retaining walls and removable through said open sides adapted to decrease the pressure with which said leaves engage each other, thereby controlling the friction of said leaves during flexing of said spring.

THEODORE R. WEBER.